P. C. BURKE.
Packing Box and Case for Fruit.
No. 202,224. Patented April 9, 1878.
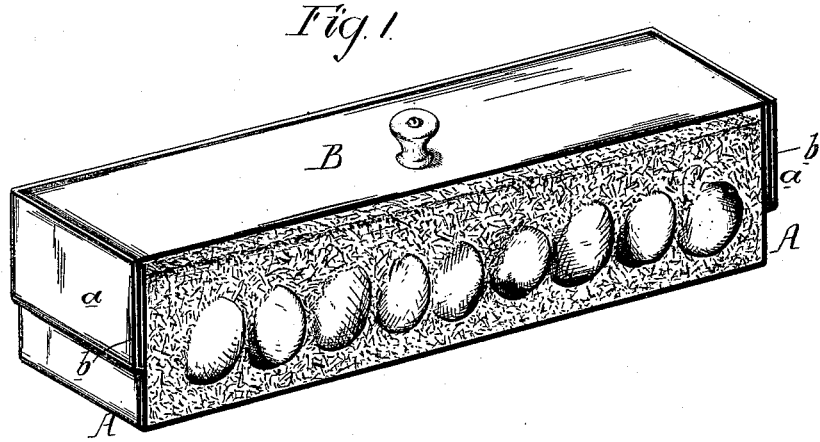
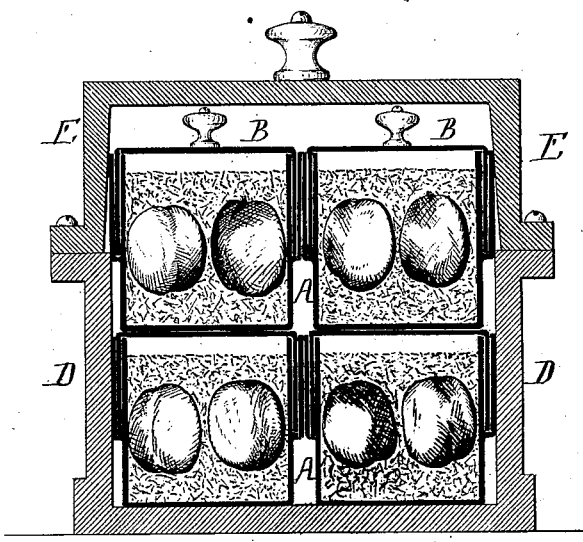

UNITED STATES PATENT OFFICE.

PATRICK C. BURKE, OF PHILADELPHIA, PENNSYLVANIA.

IMPROVEMENT IN PACKING BOX AND CASE FOR FRUITS.

Specification forming part of Letters Patent No. 202,224, dated April 9, 1878; application filed December 20, 1876.

*To all whom it may concern:*

Be it known that I, PATRICK C. BURKE, of Philadelphia, Pennsylvania, have invented an Improvement in Packing Fruit of a Perishable Nature for Transportation or Storage, of which the following is a specification:

The object of my invention is to so pack peaches and other perishable fruits that during transportation or storage the risk of decomposition will be reduced to a minimum, and this object I attain in the manner which I will now proceed to describe, reference being had to the accompanying drawings, in which—

Figure 1 is a sectional perspective view, and Fig. 2 a vertical sectional view, of devices whereby my invention may be carried into effect.

I take a sheet-metal box, A, having around the upper edge a rib, a, and after covering the bottom of said box with a layer of packing material I place the peaches or other fruit on this layer, taking care that the pieces of fruit do not touch each other. More packing is then introduced, so as to fill the interstices and completely cover the layer of fruit, and another layer is then introduced, and so on until the receptacle is full, when it is closed by the lid B, which has around the edge a deep flange, b, the latter being adapted to the channel formed between the body of the box and the rib a.

I prefer to use as a packing material chopped corn-husk, for I have found by experiment that fruit of a perishable nature when packed in this material will resist decomposition for a much longer period of time than when packed with any other material of the use of which I am now aware.

The boxes A, after being filled with fruit packed as described, and having the lids applied, are inserted into a casing, the body D and lid E of which are of such a size internally that they bind tightly upon the ribs a of the boxes A, and thus so tightly confine the flanges b of the lids that a secure joint is effected, and the access of moisture to the interior of the box prevented.

I claim as my invention—

The combination of the boxes A, having ribs a, and the lids B, having flanges b, with the tightly-fitting case D E, all substantially as set forth.

In testimony whereof I have signed my name to this specification in the presence of two subscribing witnesses.

PATRICK C. BURKE.

Witnesses:
HERMANN MOESSNER,
HARRY SMITH.